United States Patent
Wingert et al.

(10) Patent No.: US 9,622,060 B2
(45) Date of Patent: Apr. 11, 2017

(54) METHOD AND APPARATUS FOR COMMUNICATION WITH EMERGENCY DISPATCH SERVICES

(71) Applicant: QUALCOMM Incorporated, San Diego, CA (US)

(72) Inventors: Christopher R. Wingert, San Diego, CA (US); Mary C. Hardy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 13/734,950

(22) Filed: Jan. 5, 2013

(65) Prior Publication Data

US 2014/0194082 A1 Jul. 10, 2014

(51) Int. Cl.
| | |
|---|---|
| *H04M 11/04* | (2006.01) |
| *H04W 4/22* | (2009.01) |
| *H04W 40/00* | (2009.01) |
| *H04M 3/42* | (2006.01) |
| *H04M 3/51* | (2006.01) |
| *H04M 7/00* | (2006.01) |
| *H04W 76/00* | (2009.01) |

(52) U.S. Cl.
CPC ......... *H04W 4/22* (2013.01); *H04M 3/42221* (2013.01); *H04M 3/5116* (2013.01); *H04M 7/0057* (2013.01); *H04W 40/00* (2013.01); *H04W 76/007* (2013.01); *H04M 2242/04* (2013.01)

(58) Field of Classification Search
CPC ........... H04W 4/22; H04W 4/20; H04W 4/18; H04M 3/42221; H04M 3/5116; H04M 7/0057; H04M 76/007

USPC ................... 455/404.1, 404.2, 521
See application file for complete search history.

(56) References Cited

U.S. PATENT DOCUMENTS

| | | |
|---|---|---|
| 8,185,087 B2 | 5/2012 | Mitchell, Jr. et al. |
| 2005/0070315 A1 | 3/2005 | Rai et al. |
| 2008/0081646 A1 | 4/2008 | Morin et al. |
| 2010/0227584 A1 | 9/2010 | Hong |
| 2010/0246781 A1 | 9/2010 | Bradburn |
| 2012/0178410 A1 | 7/2012 | Singhal |
| 2012/0258681 A1 | 10/2012 | Hanover |
| 2012/0309340 A1 | 12/2012 | Ray |
| 2013/0183924 A1* | 7/2013 | Saigh .................... H04W 4/025 455/404.2 |

(Continued)

OTHER PUBLICATIONS

International Search Report and Written Opinion—PCT/US2013/077055—ISA/EPO—Mar. 20, 2014.

*Primary Examiner* — Khalid Shaheed
(74) *Attorney, Agent, or Firm* — Charles Eggers (57) ABSTRACT

Emergency reporting is described in which user input is received in an emergency call that is used to classify the call. Based on the classification process, emergency calls are processed to give priority to certain calls. The calls that are given the highest priority may be transmitted by a voice network and other calls may be transmitted by a data network. The reporting includes receiving user input identifying an emergency perspective of the user and selecting a data call based on the emergency perspective indicating the user is a bystander. It also includes recording an audio message from the user and transmitting the audio message to a public service answering point (PSAP) over a data network.

24 Claims, 5 Drawing Sheets

(56) References Cited

U.S. PATENT DOCUMENTS

2013/0222133 A1\* 8/2013 Schultz ................ G08G 1/205
340/539.13

\* cited by examiner

METHOD AND APPARATUS FOR COMMUNICATION WITH EMERGENCY DISPATCH SERVICES

BACKGROUND

Field

Aspects of the present disclosure relate generally to communication systems, and more particularly, to communication systems for managing communications with emergency dispatch services.

Background

In an emergency, loss of life and property may be prevented if emergency response services are notified quickly after the emergency ensues. For the most part, telephone calls from the public provide notifications to the emergency response services. In the United States of America, for example, emergency dispatch services (EDSs) operate public service answering points (PSAPs) to provide a single intake point for dispatching emergency services.

PSAPs operate 9-1-1 emergency call centers that receive voice calls from individuals reporting an emergency. A significant proportion of these calls are placed by individuals using cellular phones. As cellular phones become more pervasive, the ability to quickly report emergencies improves. However, with the improvement in access to cellular phones there is an increased chance that a voice network (circuit-switched network) may be overloaded when an emergency call is made. For example, several cellular phone users may be making calls at the same time to report a major incident. In such a scenario, the high volume of emergency calls may overload the voice network and cause a caller to the 9-1-1 system to receive a busy signal. Thus, the caller is unable to report the emergency unless the caller redials 9-1-1 and the call is answered. In some circumstances, calls regarding non-life-threatening incidents may take up call bandwidth of the voice network and thereby prevent calls to report life-threatening emergencies from reaching the emergency service dispatcher.

As practical examples, instances have been reported where motorists driving on a roadway observe emergency situations, such as an accident or car fire, and attempt to call 9-1-1 using a cellular telephone. Unfortunately, in some of these cases, the initial call and subsequent calls to 9-1-1 result in busy signals. Making several calls to 9-1-1 while driving can be unsafe. Furthermore, if the motorist has difficulty getting through to the emergency dispatcher by calling 9-1-1 then there may be unnecessary delay in the emergency services being dispatched to the scene of the incident.

As cellular phone usage increases, the likelihood of congested voice networks and callers receiving busy signals for 9-1-1 calls is likely to grow. In certain instances, when a major incident occurs, 9-1-1 calls from bystanders reporting the incident may cause congestion of the voice network and thereby cause calls from a victim of that incident to get a busy signal. Ideally, however, persons who make 9-1-1 calls, whether bystanders or victims, should never be greeted with busy signals.

SUMMARY

Methods and apparatus according to aspects of the disclosure involve reporting an emergency whereby user input is received in an emergency call that is used to classify the call. Based on this classification process, emergency calls are processed to give priority to certain calls. The calls that are given the highest priority may be transmitted by a voice network and other calls may be transmitted by a data network.

In one aspect of the disclosure, a method for reporting an emergency event, includes receiving user input identifying an emergency perspective of the user and selecting a data call based on the emergency perspective indicating the user is a bystander. The method also includes recording an audio message from the user and transmitting the audio message to a public service answering point (PSAP) over a data network.

In an additional aspect of the disclosure, a method for reporting an emergency event from a vehicle including triggering an emergency reporting application associated with a vehicle communication system in response to user activation and prompting a user to provide an emergency perspective of the emergency event. The method also includes selecting one of: a voice call and a data call, in response to the emergency perspective received from the user, recording an audio message from the user in response to selecting the data call, and transmitting the audio message to a public service answering point (PSAP) over a data network.

In an additional aspect of the disclosure a method for emergency reporting, including receiving an emergency audio message over a data network at a public service answering point (PSAP) and routing the emergency audio message to an emergency operator of a plurality of emergency operators.

In an additional aspect of the disclosure, an apparatus configured for reporting an emergency event, including means for receiving user input identifying an emergency perspective of the user and means for selecting a data call based on the emergency perspective indicating the user is a bystander. The apparatus also includes means for recording an audio message from the user and means for transmitting the audio message to a public service answering point (PSAP) over a data network.

In an additional aspect of the disclosure, an apparatus configured for reporting an emergency event from a vehicle, including means for triggering an emergency reporting application associated with a vehicle communication system in response to user activation and means for prompting a user to provide an emergency perspective of the emergency event. The apparatus also includes means for selecting one of: a voice call and a data call, in response to the emergency perspective received from the user, means for recording an audio message from the user in response to selecting the data call and means for transmitting the audio message to a public service answering point (PSAP) over a data network.

In an additional aspect of the disclosure, an apparatus configured for emergency reporting, including means for receiving an emergency audio message over a data network at a public service answering point (PSAP) and means for routing the emergency audio message to an emergency operator of a plurality of emergency operators.

In an additional aspect of the disclosure, a computer program product has a non-transitory computer-readable medium having program code recorded thereon. This program code includes program code to receive user input identifying an emergency perspective of the user and program code to select a data call based on the emergency perspective indicating the user is a bystander, program code to record an audio message from the user and program code to transmit the audio message to a public service answering point (PSAP) over a data network.

In an additional aspect of the disclosure, a computer program product has a non-transitory computer-readable medium having program code recorded thereon. This program code includes code to trigger an emergency reporting application associated with a vehicle communication system in response to user activation, code to prompt a user to provide an emergency perspective of the emergency event and code to select one of: a voice call and a data call, in response to the emergency perspective received from the user. The program code also includes code to record an audio message from the user in response to selecting the data call and code to transmit the audio message to a public service answering point (PSAP) over a data network.

In an additional aspect of the disclosure, a computer program product has a non-transitory computer-readable medium having program code recorded thereon. This program code includes program code to receive an emergency audio message over a data network at a public service answering point (PSAP) and program code to route the emergency audio message to an emergency operator of a plurality of emergency operators.

In an additional aspect of the disclosure, an apparatus includes at least one processor and a memory coupled to the processor. The processor is configured to receive user input identifying an emergency perspective of the user and select a data call based on the emergency perspective indicating the user is a bystander. The processor is also configured to record an audio message from the user and transmit the audio message to a public service answering point (PSAP) over a data network.

In an additional aspect of the disclosure, an apparatus includes at least one processor and a memory coupled to the processor. The processor is configured to trigger an emergency reporting application associated with a vehicle communication system in response to user activation and to prompt a user to provide an emergency perspective of the emergency event. The processor is also configured to select one of: a voice call and a data call, in response to the emergency perspective received from the user, to record an audio message from the user in response to selecting the data call, and to transmit the audio message to a public service answering point (PSAP) over a data network.

In an additional aspect of the disclosure, an apparatus includes at least one processor and a memory coupled to the processor. The processor is configured to receive an emergency audio message over a data network at a public service answering point (PSAP) and to route the emergency audio message to an emergency operator of a plurality of emergency operators.

DETAILED DESCRIPTION

In seeking to solve the problem of a congested voice network that may cause 9-1-1 callers to get a busy signal, it is useful to consider the problem in terms of allocation of a limited resource in the context of emergency dispatch services. In this context, the bandwidth for the voice network to a PSAP is the limited resource. A guiding principle with respect to allocating this limited resource according to aspects of the disclosure is that the most urgent calls should be given the highest priority over the voice network. In this regard, one aspect of the disclosure envisions classifying callers (users) as either a victim of an emergency or a bystander of the emergency and allocating the resources of the voice network based on this classification. In other words, voice network resources are allocated based on a user's emergency perspective.

For instance, a motorist whose motor vehicle has just been involved in an accident would be classified as a victim. In contrast, a motorist who merely observes the accident, but was not involved in the accident, would be classified as a bystander. It is assumed, in aspects of the disclosure, that a call from the victim should be given a higher priority to the voice network than a call from the bystander. The difference in priority is because the victim may be able to convey more critical information that might not be available to the bystander. This information may include the condition of the victim, how the accident happened etc. Notwithstanding the fact that the victim's call should be given priority under this approach, it is important that the call from the bystander is also received by the PSAP. This is so because, for some incidents, the call from the bystander to 9-1-1 may be the only call about the incident. Furthermore, if bystanders can easily place calls to 9-1-1 then it encourages (or at least does not discourage) members of the public to call for help when others need it.

Figure 1:
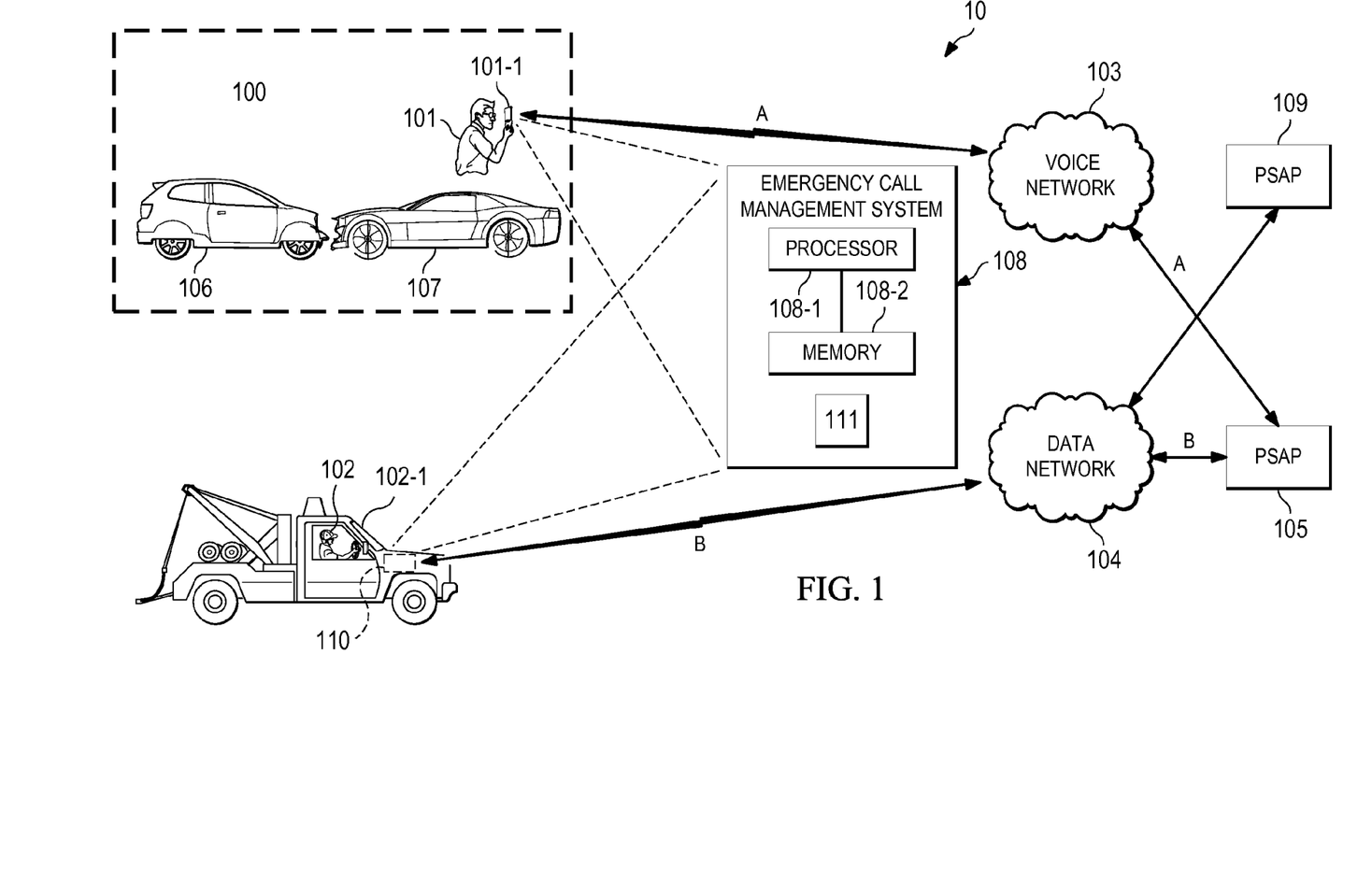
FIG. 1 is a block diagram conceptually illustrating an example of an emergency communication system according to one aspect of the disclosure.

FIG. 1 is a block diagram conceptually illustrating an example of an emergency communication system according to one aspect of the disclosure. In operation, system 10 classifies voice calls into different emergency classifications and processes the voice calls based on the emergency classification. In one aspect of the disclosure, system 10 allocates voice network resources in a manner such that a victim is given priority for direct two way voice communication with an emergency dispatcher at PSAP 105. Further, a bystander's call, though it may not be given the highest priority, is handled in a manner that ensures delivery to PSAP 105.

FIG. 1 shows how communications resulting from accident scene 100 may be handled by system 10 according to aspects of the disclosure. Motor vehicles 106 and 107 have collided to create accident scene 100. Motorist 101 was the driver of vehicle 106. As such, based on the previously mentioned classification system, motorist 101 is classified as a victim. To get help, motorist 101 makes a 9-1-1 call using cellular phone 101-1.

In this example regarding accident scene 100, motorist 102 was not involved in the accident. However, motorist 102 was driving motor vehicle 102-1 when motorist 102 observed accident scene 100. Based on what motorist 102 observed, motorist 102 makes a 9-1-1 call to make a report. To make this call, motorist 102 uses emergency call system 110, which is integrated into motor vehicle 102-1 for making emergency calls to 9-1-1.

According to aspects of the disclosure, emergency call management system(s) ECMS 108 manages the 9-1-1 calls from motorist 101 and motorist 102. ECMS 108 may be implemented as software and hardware in cellular phone 101-1, in motor vehicle 102-1, on a personal computer or on a central server in communication with cellular phone 101-1, motor vehicle 102-1 or a personal computer. ECMS 108 includes processor 108-1 and memory 108-2 communicatively connected to each other.

Figure 2:
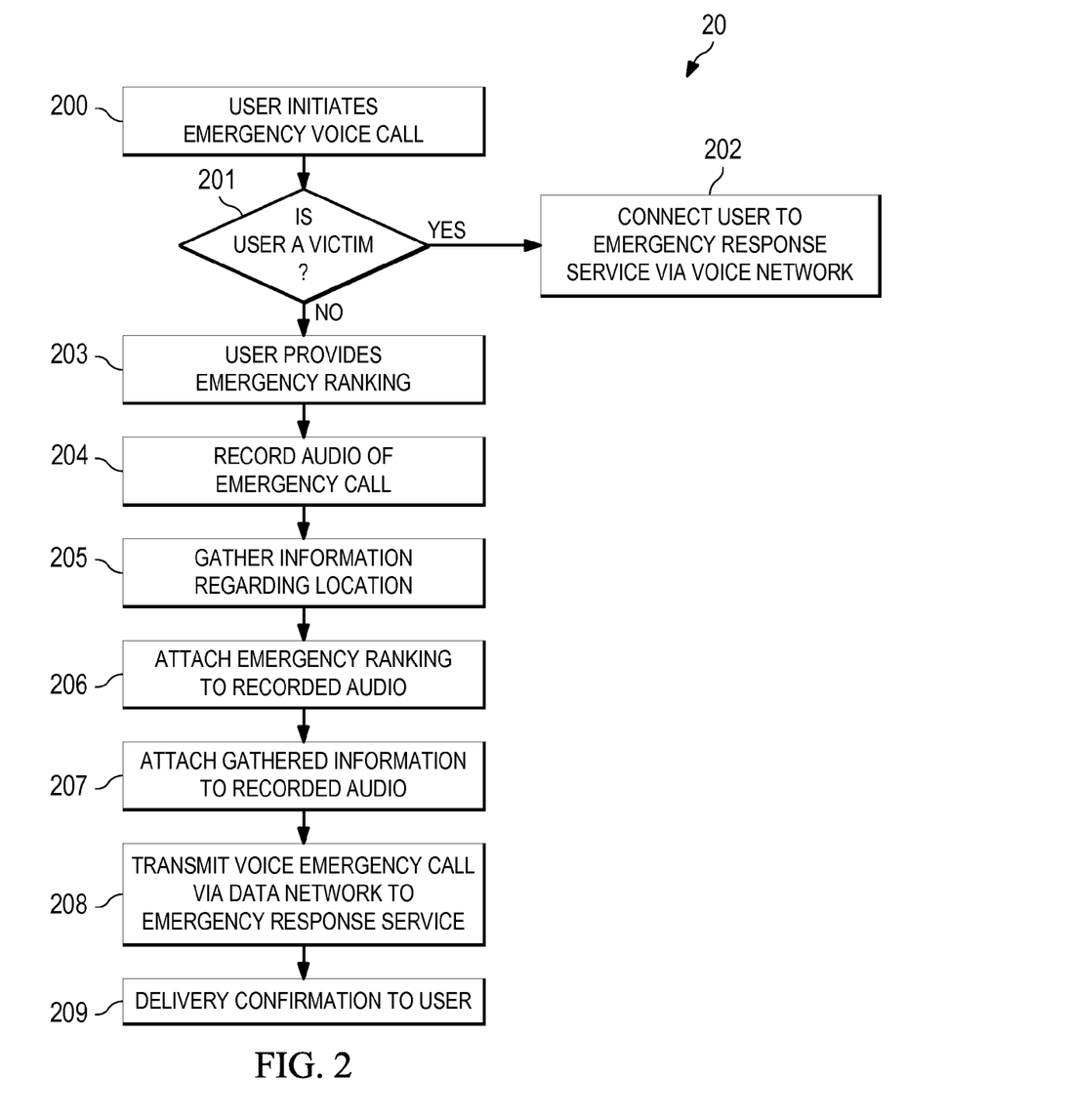
FIG. 2 is a functional block diagram conceptually illustrating example blocks executed to implement one aspect of the disclosure.

FIG. 2 is a functional block diagram conceptually illustrating example blocks executed to implement communications of motorist 101 and motorist 102 with PSAP 105 according to one aspect of the disclosure. Block diagram 20 begins at block 200, when motorist 101 or motorist 102 initiates (e.g. by triggering a button) an emergency voice call to PSAP 105 by dialing 9-1-1. As mentioned above and as illustrated in FIG. 1, motorist 101 uses cellular phone 101-1 to call while motorist 102 uses emergency call system 110 of motor vehicle 102-1.

At block 201, processor 108-1 determines whether the caller is a victim or a bystander. This determination may be done in a number of methods. One method may involve processor 108-1 prompting the caller to provide this information. The response from the user may be provided orally, which could be processed by processor 108-1 using speech recognition software. Another method is for motorist 101 or 102 to provide this information by making a selection on a touch screen presented on cellular phone 101-1 or on emergency call system 110. Once processor 108-1 determines or receives information that the caller is a victim or a bystander, processor 108-1 selects different paths for each classification of call and routes the call on its selected path.

In aspects of the disclosure, the routes that may be selected have different communication modes. In the illustrated example of FIGS. 1 and 2, because motorist 101 provides information to processor 108-1 that he or she is a victim, at block 202, processor 108-1 selects voice network 103 as the communication mode (route "A") to be established between motorist 101 and PSAP 105. On the other hand, because motorist 102 identifies himself or herself to processor 108-1 as a bystander, processor 108-1 will select data network 104 (route "B") as the communication mode to be established between motorist 102 and PSAP 105.

It should be noted that though a user may use various modes of communication, such as e-mail, text and the like to initiate communication with a PSAP, it is more convenient to communicate orally. Further, some people, such as the elderly are not as involved in some modes of communication as other portions of the population, e.g. communication by texting. Furthermore, texting and driving may be less safe than talking on the phone and driving. Therefore, it may be desirable in an emergency call management system that a user who is a victim is able to communicate orally with a PSAP.

Referring to block diagram 20, if the caller's emergency perspective is a bystander, processor 108-1, at block 203, may prompt the caller to rank the emergency in terms of seriousness. For example, processor 108-1 may provide 4 different rankings, with numerical designations to the caller as follows: 1—not urgent, 2—moderately urgent, 3—urgent, 4—extremely urgent. Other classifications could include whether life is threatened, property is threatened, or the like. As with the indication of the caller's emergency perspective, the emergency ranking information from the caller may be provided orally or by selections made on a touch screen or some other method. Processor 108-1 receives the caller's emergency ranking input. At block 204, processor 108-1, records audio of the emergency call to memory 108-2 as voice text. The voice text is a recorded audio of the user that is transmitted over the data network instead of the voice network.

In certain emergency situations, it may be desirable that information about the environment associated with the incident being reported be sent to the PSAP. For example, when the incident being reported is an accident, it may be useful to send to the PSAP information such as GPS location of the accident, temperature where the accident occurred and the like. As such, cellular phone 101-1 and an emergency call system 110 of motor vehicle 102-1 may be configured to provide this information. For example, cellular phone 101-1 and emergency call system 110 may be equipped with sensor 111 to detect temperature and other parameters related to the location of cellular phone 101-1 or emergency call system 110. Therefore, according to aspects of the disclosure, at block 205, cellular phone 101-1 and emergency call system 110 gathers information about the location of the incident being reported.

At block 206, processor 108-1 attaches the previously received emergency ranking to the voice text. The emergency ranking may be attached in different forms such as audio, text, video etc. Additionally, at block 207, processor 108-1 attaches the information gathered regarding the location of the incident. Again, this information may be attached to the voice text in forms such as audio, text, video etc. Processor 108-1 then transmits the voice text with the attachments via data network 104 to PSAP 105, at block 208.

Because, motorist 102 is not in a traditional voice call with a dispatcher at PSAP 105, it may be desirable for system 10 to provide some feedback to motorist 102 as to whether the voice text was safely delivered. This feedback takes place at block 209. Feedback could be provided by a voice or a text message saying "Thank you, we received your emergency call" or some such message. This feedback feature prevents unnecessary repeat calls.

The emergency classification based on a user's perspective to an emergency as described above is one example of classifying emergency voice calls. Alternative or additional classifications may be used according to aspects of the disclosure. For example, the voice calls may be classified based on whether the incident being reported involves a life threatening situation or not.

Figure 3:
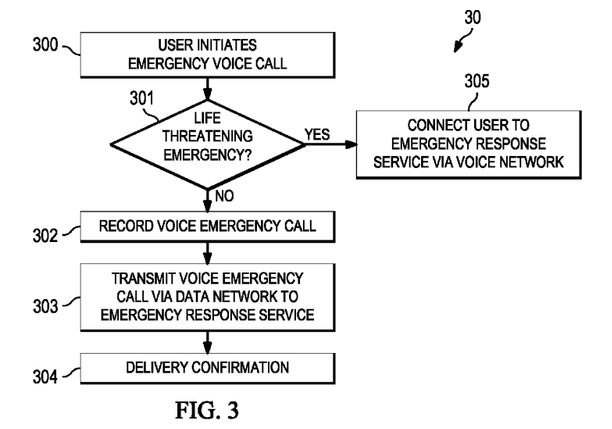
FIG. 3 is a functional block diagram conceptually illustrating example blocks executed to implement one aspect of the disclosure.

FIG. 3 is a functional block diagram conceptually illustrating example blocks executed to implement one aspect of the disclosure. Block diagram 30 is being considered in the context of accident scene 100 shown in FIG. 1. Block diagram 30 begins at block 300, when motorist 101 or motorist 102 initiates an emergency voice call to PSAP 105 by dialing 9-1-1. Motorist 101 uses cellular phone 101-1 to call while motorist 102 uses the emergency call system 110 of car 102-1.

At block 301, processor 108-1 determines whether the incident being reported is a life-threatening or non-life threatening situation. This determination may be done in a number of ways. One method may involve processor 108-1 prompting the user to provide this information. The feedback from the user may be provided orally which could be processed by processor 108-1 using speech recognition software. Another method is for motorist 101 or motorist 102 to provide this information by making a selection on a touch screen of cellular phone 101-1 or emergency call system 110 of car 102-1.

Once processor 108-1 determines or receives information that the incident being reported is life-threatening or not, processor 108-1 may select different paths for each classification of call and routes the call on its selected path. In the illustrated example of FIGS. 1 and 3, motorist 101 is aware of a passenger in vehicle 106 with a life-threatening injury. As such, motorist 101 indicates to processor 108-1 that the incident being reported is life-threatening. Based on this input of a life-threatening situation, at block 305, processor 108-1 will select voice network 103 as the communication mode (route A) to be established between motorist 101 and PSAP 105. However, motorist 102, not being aware that there is a life threatening injury, indicates to processor 108-1 that the incident is non-life-threatening. Consequently, processor 108-1 selects data network 104 as the communication mode (route B) to be established between motorist 102 and PSAP 105.

At block 302, processor 108-1 records the non-life-threatening voice call (audio) to memory 108-2 as voice text. Processor 108-1 then transmits voice text via data network 104 to PSAP 105 at block 303. At block 304, feedback regarding the delivery of the recorded voice call may be provided as described above.

As can be appreciated, the different emergency classifications may also be used to route the voice calls to different destinations. For example, non-life threatening incidents may get reported to a particular PSAP, while life threatening emergencies may get reported to a different PSAP. In this way, resources such as equipment and personnel can be more easily managed and coordinated. The feature of routing voice calls to different destinations based on different emergency classifications may be implemented with or without routing based on communication mode.

Figure 4:
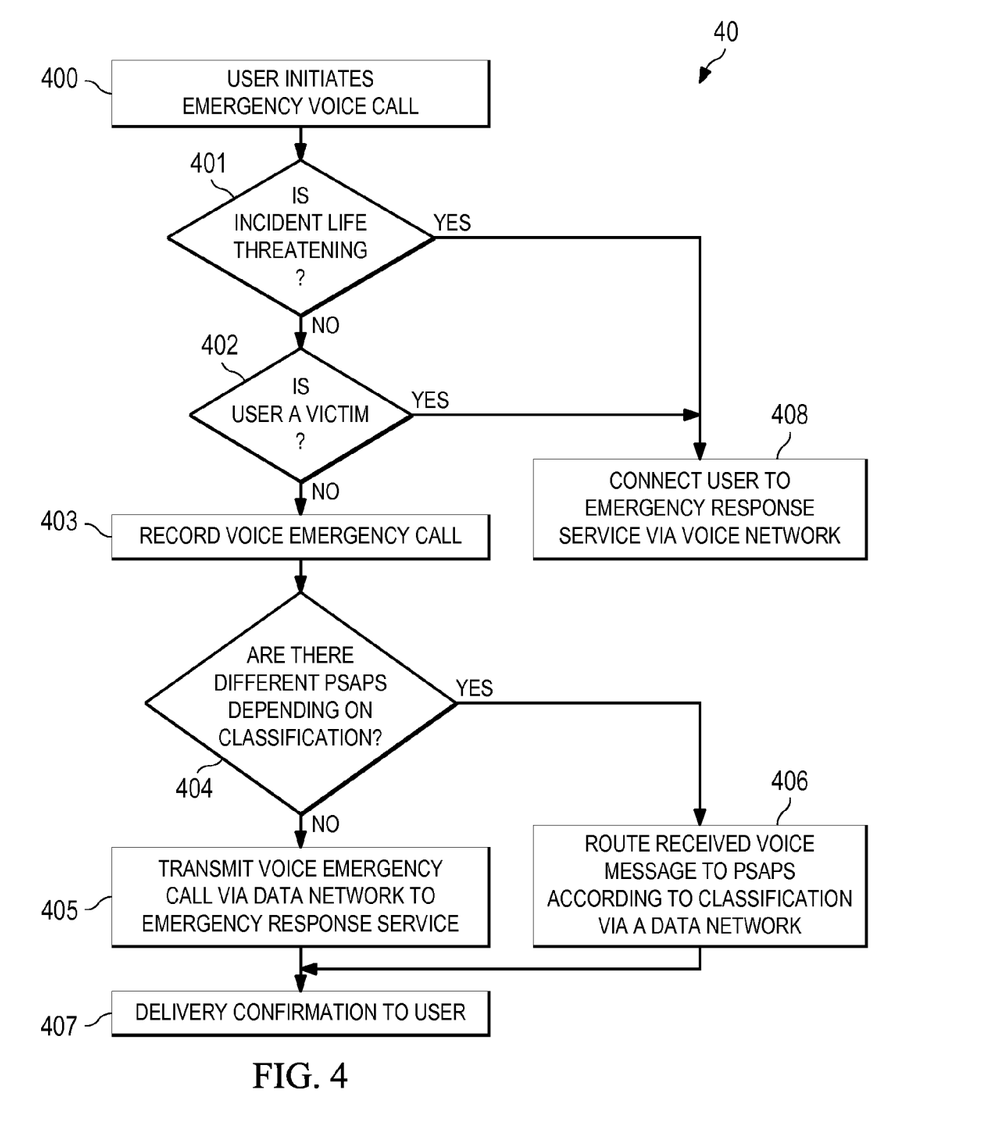
FIG. 4 is a functional block diagram conceptually illustrating example blocks executed to implement one aspect of the disclosure.

As noted above, different emergency classification systems may be implemented according to aspects of the disclosure. Moreover, different classification systems may be combined according to aspects of the disclosure. For example, FIG. 4 is a functional block diagram conceptually illustrating example blocks executed to implement one aspect of the disclosure in which a classification with respect to whether an incident is life threatening is implemented along with a classification as to whether the user is a victim or bystander. Further, in this block diagram, calls are routed to different PSAPs depending on a classification associated with the call.

Block diagram 40 begins at block 400, when motorist 101 or motorist 102 initiates an emergency voice call to a PSAP by dialing 9-1-1. As in the examples above, motorist 101 uses cellular phone 101-1 to call while motorist 102 uses emergency call system 110 of car 102-1.

At block 401, processor 108-1 determines whether the incident being reported is a life-threatening or non-life threatening situation. This determination may be made by methods mentioned above. One method may involve processor 108-1 prompting the caller to provide this information. The response from the user may be provided orally, which could be processed by processor 108-1 using speech recognition software. Another method is for motorist 101 or 102 to provide this information by making a selection on a touch screen, as described above. Once processor 108-1 determines or receives information that the incident being reported is life threatening or not, processor 108-1 may select different paths for each classification of call and routes the call on its selected path. Thus, if motorist 101 indicates that the incident is life-threatening, motorist 101's voice call is connected to PSAP 105 via a voice network (route A) at block 408. Motorist 102, on the other hand, indicates a non-life threatening incident and thus the block diagram proceeds to block 402.

At block 402, it is determined whether the user is a victim or a bystander by methods described above with respect to block diagram 20. In this way, even if the incident is non-life-threatening, it may be desirable to connect the victim via voice network 103 at block 408, so that the victim can provide firsthand information regarding the incident.

If the user is not a victim, at block 403, processor 108-1 selects data network 104 as the communication mode to be established with PSAP 105 and records the non-life-threatening voice call of the bystander. In the current example, processor 108-1 records the voice call of motorist 102. At block 404, a determination may be made by processor 108-1, based on the region being called from, whether there are different PSAPs to which the recorded voice call should be sent in accordance with the emergency classification of the call (e.g. PSAP 105 or 109). If there are different PSAPs, at block 406, the recorded voice call is routed to the appropriate PSAP at block 406. If there is only one PSAP, then the recorded voice call is transmitted as voice text via data network 104 to that PSAP at block 405. At block 407, feedback regarding the delivery of the recorded voice call may be provided as described above.

At PSAPs 105 and 109, incoming emergency voice text may be received and queued for an emergency operator to triage and assign to a particular emergency service in a hierarchical ordering based on emergency level. At PSAPs 105 and 109, incoming emergency voice text may be received and routed to a particular emergency operator from a plurality of emergency operators based on the emergency ranking attached to the voice text. For example, there may be certain operators to whom only voice texts with emergency ranking 1 (not urgent) are sent and other operators to whom only voice texts with emergency ranking 2 (moderately urgent) are sent and so on.

The receipt and routing at PSAPs 105 and 109 may be done by a computer system with processor and software specially configured to analyze an emergency ranking of the voice text and routes the voice text based on the emergency ranking. As such, the computer system would be configured to analyze ranking information attached to the incoming voice text in whatever format the attachment is in (e.g. audio, text, video etc.) The computer system may also be configured to assign an action rank to the voice text. The action rank determines in what order action will be taken by an operator on the voice text. Thus, the computer system may be configured to select an emergency operator based on the action rank of the voice text and route the voice text to the selected emergency operator.

It should be noted that, in certain aspects of the disclosure, the emergency ranking used to sort and route the voice texts to operators could also be determined by the PSAP's computer system. For example the PSAPs computer system may include a processor and software configured to analyze the voice text and based on this analysis give the voice text an emergency classification. The analysis may involve the use of speech recognition software to detect key phrases or words such as "unconscious," "not responding" and the like, for example, to determine that the emergency situation is serious. Furthermore, the analysis of the voice text may include voice stress analysis of the voice text. Voice stress analysis involves the detection of high stress in a speaker's voice. Voice stress analysis uses the microtremors in a speaker's voice to detect the high stress. Thus, aspects of the disclosure include the PSAPs computer system having a processor and software configured to perform voice stress analysis of voice texts received at the PSAP. Based on the results of the voice stress analysis, the PSAPs computer system can assign emergency rankings to the voice texts. In this way, higher priority can be given to voice texts deemed to be coming from someone who is under high stress.

Again, the PSAP's computer system may also be configured to assign an action rank to the voice text. The action rank may be based on the emergency rankings assigned to the voice text. As described above, the emergency ranking may be assigned based on user input, based on speech recognition analysis for key phrases or words, based on voice stress analysis or based on combinations thereof. The action rank determines in what order action will be taken by an operator on the voice text and select an emergency operator based on the action rank of the voice text and route the voice text to the selected emergency operator.

Although aspects of the present disclosure have been described with reference to the blocks of FIGS. 2-4, it should be appreciated that operation of the present disclosure is not limited to the particular blocks and/or the particular order of the blocks illustrated in FIGS. 2-4. Accordingly, aspects of the disclosure may provide functionality as described herein using various blocks in a sequence different than those of FIGS. 2-4 or in combination that includes blocks from different figures.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Figure 5:
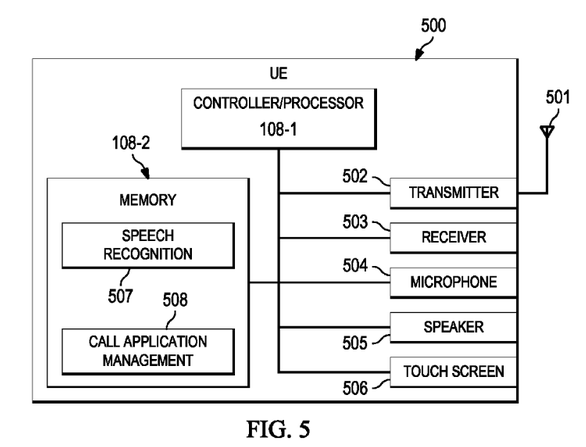
FIG. 5 is a block diagram conceptually illustrating user equipment configured according to one aspect of the disclosure.

FIG. 5 is a block diagram conceptually illustrating a UE 500 configured according to one aspect of the present disclosure. UE 500 may be devices such as a mobile device, a vehicle communication system or a personal computer. UE 500 includes controller/processor 108-1 that operates, executes, and manages the functional aspects of the UE 500. UE 500 includes microphone 504 and speech recognition application 507 under control of controller/processor 108-1 for providing means for receiving user input identifying an emergency perspective of the user. Further, touch screen 506 and call management application 508 under control of controller/processor 108-1 may also for provide means for receiving user input identifying an emergency perspective of the user. Controller/processor 108-1 and call management application 508 provides means for selecting a data call based on the emergency perspective indicating the user is a bystander. UE 500 includes microphone 504 and memory 108-2 under control of controller/processor 108-1 for providing means for recording an audio message from the user. UE 500 includes antennas 501 and transmitter 502 under control of processor 108-1 for providing means for transmitting the audio message to a public service answering point (PSAP) over a data network.

Figure 6:
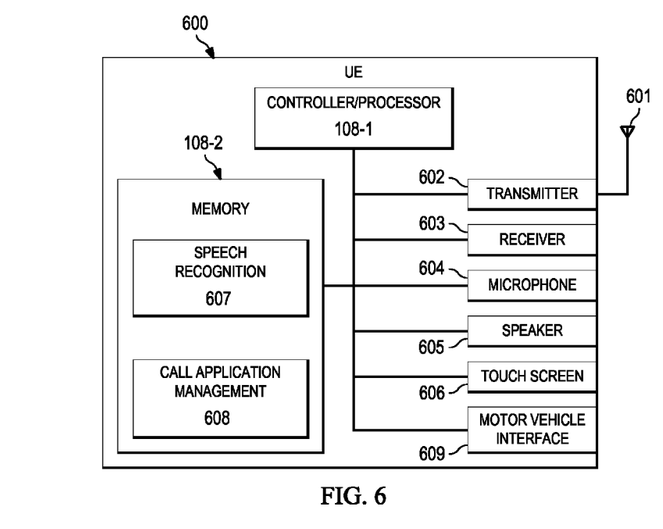
FIG. 6 is a block diagram conceptually illustrating a vehicle emergency call system configured according to one aspect of the disclosure.

FIG. 6 is a block diagram conceptually illustrating a vehicle emergency call system 600 configured according to one aspect of the present disclosure. Vehicle emergency call system 600 includes controller/processor 108-1 that operates, executes, and manages the functional aspects of the vehicle emergency call system 600. Vehicle emergency call system 600 includes touch screen 606 under control of controller/processor 108-1 for providing means for triggering an emergency reporting application associated with a vehicle communication system in response to user activation. Vehicle emergency call system 600 includes speaker 605 and call application 608 under control of controller/processor 108-1 for providing means for prompting a user to provide an emergency perspective of the emergency event. Vehicle emergency call system 600 includes controller/processor 108-1 and call management application 608 providing means for selecting one of: a voice call and a data call, in response to the emergency perspective received from the user. Vehicle emergency call system 600 includes microphone 604 and memory 108-2 under control of controller/processor 108-1 for providing means for recording an audio message from the user in response to selecting the data call. Vehicle emergency call system 600 includes antennas 601 and transmitter 602 under control of processor 108-1 for providing means for transmitting the audio message to a public service answering point (PSAP) over a data network. Vehicle emergency call system 600 also includes motor vehicle interface 609 to interface with the power and electronic system of a motor vehicle.

Figure 7:
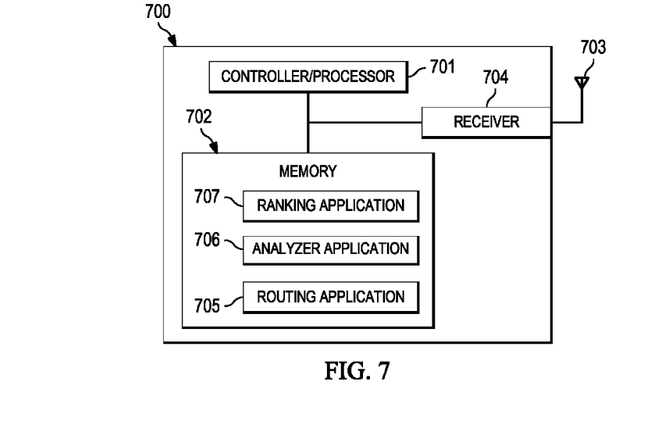
FIG. 7 is a block diagram conceptually illustrating a PSAP communication system configured according to one aspect of the disclosure.

FIG. 7 is a block diagram conceptually illustrating PSAP communication system 700 configured according to one aspect of the present disclosure. PSAP communication system 700 includes controller/processor 701 that operates, executes, and manages the functional aspects of communication system 700. PSAP communication system 700 includes antenna 703 and receiver 704 to provide means for receiving an emergency audio message over a data network at a public service answering point (PSAP). The routing application 705 under control of controller/processor 701 provides means for routing the emergency audio message to an emergency operator of a plurality of emergency operators. Analyzer application 706 under control of controller/processor 701 provides means for analyzing an emergency ranking associated with the emergency audio message. Analyzing, as performed by Analyzer application 706 under control of controller/processor 701, may include detecting an emergency ranking previously assigned to an audio message by a user, detecting an emergency ranking established by speech recognition and detecting an emergency ranking established by voice stress analysis. In aspects of the disclosure, Analyzer application 706 under control of controller/processor 701 may be configured to assign an emergency ranking to an audio message by performing speech recognition analysis of the audio message or performing voice stress analysis of the audio message, or both. Ranking application 707 under control of controller/processor 701 provides means for assigning an action rank according to the emergency ranking.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 2-4 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for reporting an emergency event, comprising:
   prompting a user to provide input indicating whether the user is a victim or a bystander, thereby identifying an emergency perspective of the user;
   receiving the user's input identifying the emergency perspective of the user;
   performing a data call when the emergency perspective identifies the user as a bystander and not as a victim, including:
      recording an audio message from the user; and
      transmitting the audio message to a public service answering point (PSAP) over a data network resource of the PSAP; and
   performing a voice call when the emergency perspective identifies the user as a victim and not as a bystander, including establishing voice communications with the PSAP over a voice network resource of the PSAP,
   wherein the method is performed by at least one of a mobile device or a vehicle communication system.

2. The method of claim 1, further comprising:
   receiving an emergency ranking from the user; and
   adding an emergency rank indicator to the audio message corresponding to the emergency ranking.

3. The method of claim 1, further comprising:
   retrieving condition information from one or more sensors; and
   attaching the condition information to the audio message.

4. A method for reporting an emergency event, comprising:
   triggering an emergency reporting application associated with at least one of a mobile device or a vehicle communication system in response to activation by a user;
   prompting the user to provide an emergency perspective of the emergency event indicating at least whether the user is a victim or a bystander;
   performing one of: a voice call and a data call, in response to the emergency perspective received from the user, including:
   when the emergency perspective indicates that the user is a bystander and not a victim:
      recording an audio message from the user;
      selecting a public service answering point (PSAP) among a plurality of at least two PSAPs based on an emergency classification of the audio message indicating whether or not the emergency is a life threatening emergency; and transmitting the audio message to the selected PSAP over a data network resource of the selected PSAP; and when the emergency perspective indicates that the user is a victim and not a bystander, establishing voice communications with at least one PSAP over a voice network resource of the at least one PSAP, wherein the method is performed by at least one of the mobile device or the vehicle communication system.

5. The method of claim 4, further comprising:
receiving an emergency ranking from the user; and
adding an emergency rank indicator to the audio message corresponding to the emergency ranking.

6. The method of claim 5, further comprising:
retrieving condition information from one or more sensors; and
attaching the condition information to the audio message.

7. An apparatus configured for reporting an emergency event, comprising:
means for prompting a user to provide input indicating whether the user is a victim or a bystander, thereby identifying an emergency perspective of the user;
means for receiving the user's input identifying the emergency perspective of the user;
means for performing a data call when the emergency perspective identifies the user as a bystander and not as a victim, including:
means for recording an audio message from the user; and
means for transmitting the audio message to a public service answering point (PSAP) over a data network resource of the PSAP; and
means for performing a voice call when the emergency perspective identifies the user as a victim and not as a bystander, including establishing voice communications with the PSAP over a voice network resource of the PSAP,
wherein the apparatus corresponds to at least one of a mobile device or a vehicle communication system.

8. The apparatus of claim 7, further comprising:
means for receiving an emergency ranking from the user; and
means for adding an emergency rank indicator to the audio message corresponding to the emergency ranking.

9. The apparatus of claim 7, further comprising:
means for retrieving condition information from one or more sensors; and
means for attaching the condition information to the audio message.

10. An apparatus configured for reporting an emergency event, comprising:
means for triggering an emergency reporting application associated with at least one of a mobile device or a vehicle communication system in response to activation by a user;
means for prompting the user to provide an emergency perspective of the emergency event indicating at least whether the user is a victim or a bystander;
means for performing one of: a voice call and a data call, in response to the emergency perspective received from the user, including:
when the emergency perspective indicates that the user is a bystander and not a victim:
means for recording an audio message from the user;
selecting a public service answering point (PSAP) among a plurality of at least two PSAPs based on an emergency classification of the audio message indicating whether or not the emergency is a life threatening emergency; and
means for transmitting the audio message to the selected PSAP over a data network resource of the selected PSAP; and when the emergency perspective indicates that the user is a victim and not a bystander, means for establishing voice communications with at least one PSAP over a voice network resource of the at least one PSAP, wherein the apparatus corresponds to at least one of the mobile device or the vehicle communication system.

11. The apparatus of claim 10, further comprising:
means for receiving an emergency ranking from the user; and
means for adding an emergency rank indicator to the audio message corresponding to the emergency ranking.

12. The apparatus of claim 10, further comprising:
means for retrieving condition information from one or more sensors; and
means for attaching the condition information to the audio message.

13. A computer program product for reporting an emergency event, comprising:
a non-transitory computer-readable medium having program code recorded thereon, the program code including:
program code to prompt a user to provide input indicating whether the user is a victim or a bystander, thereby identifying an emergency perspective of the user;
program code to receive the user's input identifying the emergency perspective of the user;
program code to perform a data call when the emergency perspective identifies the user as a bystander and not a victim, including:
program code to record an audio message from the user; and
program code to transmit the audio message to a public service answering point (PSAP) over a data network resource of the PSAP; and
program code to perform a voice call when the emergency perspective identifies the user as a victim and not as a bystander, including program code to establish voice communications with the PSAP over a voice network resource of the PSAP,
wherein the program code is configured to be enacted by at least one of a mobile device or a vehicle communication system.

14. The computer program product of claim 13, further comprising:
program code to receive an emergency ranking from the user; and
program code to add an emergency rank indicator to the audio message corresponding to the emergency ranking.

15. The computer program product of claim 13, further comprising:
program code to retrieve condition information from one or more sensors; and
program code to attach the condition information to the audio message.

16. A computer program product for reporting an emergency event, comprising:

a non-transitory computer-readable medium having program code recorded thereon, the program code including:
  program code to trigger an emergency reporting application associated with at least one of a mobile device or a vehicle communication system in response to activation by a user;
  program code to prompt the user to provide an emergency perspective of the emergency event indicating at least whether the user is a victim or a bystander;
  program code to perform one of: a voice call and a data call, in response to the emergency perspective received from the user, including:
  when the emergency perspective indicates that the user is a bystander and not a victim:
    program code to record an audio message from the user;
    program code to select a public service answering point (PSAP) among a plurality of at least two PSAPs based on an emergency classification of the audio message indicating whether or not the emergency is a life threatening emergency; and
    program code to transmit the audio message to the selected PSAP over a data network resource of the selected PSAP; and
  when the emergency perspective indicates that the user is a victim and not a bystander, program code to establish voice communications with at least one PSAP over a voice network resource of the at least one PSAP,
  wherein the program code is configured to be enacted by at least one of the mobile device or the vehicle communication system.

17. The computer program product of claim 16, further comprising:
  program code to receive an emergency ranking from the user; and
  program code to add an emergency rank indicator to the audio message corresponding to the emergency ranking.

18. The computer program product of claim 16, further comprising:
  program code to retrieve condition information from one or more sensors; and
  program code to attach the condition information to the audio message.

19. An apparatus configured for reporting an emergency event, the apparatus comprising:
  at least one processor; and
  a memory coupled to the at least one processor,
  wherein the at least one processor is configured to:
    prompt a user to provide input indicating whether the user is a victim or a bystander, thereby identifying an emergency perspective of the user;
    receive the user's input identifying the emergency perspective of the user;
    perform a data call when the emergency perspective identifies the user as a bystander and not as a victim, including:
      record an audio message from the user; and
      transmit the audio message to a public service answering point (PSAP) over a data network resource of the PSAP; and
    perform a voice call when the emergency perspective identifies the user as a victim and not as a bystander, including establish voice communications with the PSAP over a voice network resource of the PSAP,
  wherein the apparatus corresponds to at least one of a mobile device or a vehicle communication system.

20. The apparatus of claim 19 wherein the at least one processor is further configured:
  to receive an emergency ranking from the user; and
  to add an emergency rank indicator to the audio message corresponding to the emergency ranking.

21. The apparatus of claim 19 wherein the at least one processor is further configured:
  to retrieve condition information from one or more sensors; and
  to attach the condition information to the audio message.

22. An apparatus configured for reporting an emergency event, the apparatus comprising:
  at least one processor; and
  a memory coupled to the at least one processor,
  wherein the at least one processor is configured to:
    trigger an emergency reporting application associated with at least one of a mobile device or a vehicle communication system in response to activation by a user;
    prompt the user to provide an emergency perspective of the emergency event indicating at least whether the user is a victim or a bystander;
    perform one of: a voice call and a data call, in response to the emergency perspective received from the user;
    record an audio message from the user;
    select a public service answering point (PSAP) among a plurality of at least two PSAPs based on an emergency classification of the audio message indicating whether or not the emergency is a life threatening emergency; and
    transmit the audio message to a the selected PSAP over a data network resource of the selected PSAP; and
    when the emergency perspective indicates that the user is a victim and not a bystander, to establish voice communications with at least one PSAP over a voice network resource of the at least one PSAP,
  wherein the apparatus corresponds to at least one of the mobile device or the vehicle communication system.

23. The apparatus of claim 22, wherein the at least one processor is further configured:
  to receive an emergency ranking from the user; and
  to add an emergency rank indicator to the audio message corresponding to the emergency ranking.

24. The apparatus of claim 22, wherein the at least one processor is further configured:
  to retrieve condition information from one or more sensors; and
  to attach the condition information to the audio message.

* * * * *